United States Patent
Pandit et al.

(10) Patent No.: US 11,615,109 B1
(45) Date of Patent: Mar. 28, 2023

(54) EFFICIENT DESERIALIZATION FROM STANDARDIZED DATA FILES

(71) Applicant: Pinterest, Inc., San Francisco, CA (US)

(72) Inventors: Bhalchandra Pandit, Kirkland, WA (US); Siyang Xie, Mountain View, CA (US)

(73) Assignee: Pinterest, Inc., San Francisco, CA (US)

(*) Notice: Subject to any disclaimer, the term of this patent is extended or adjusted under 35 U.S.C. 154(b) by 16 days.

(21) Appl. No.: 17/141,911

(22) Filed: Jan. 5, 2021

(51) Int. Cl.
*G06F 16/25* (2019.01)
*G06F 16/178* (2019.01)

(52) U.S. Cl.
CPC ........ *G06F 16/258* (2019.01); *G06F 16/1794* (2019.01)

(58) Field of Classification Search
CPC ............................ G06F 16/258; G06F 16/1794
See application file for complete search history.

(56) References Cited

U.S. PATENT DOCUMENTS

| | | | |
|---|---|---|---|
| 2005/0165724 A1* | 7/2005 | West | G06F 16/258 |
| 2007/0299863 A1* | 12/2007 | Fu | G06F 9/4493 707/999.102 |
| 2013/0007027 A1* | 1/2013 | Hazel | G06F 16/258 707/756 |
| 2013/0185810 A1 | 7/2013 | Suchter et al. | |
| 2015/0178292 A1 | 6/2015 | Nie | |
| 2015/0293962 A1 | 10/2015 | Oortmerssen et al. | |
| 2018/0089269 A1* | 3/2018 | Pal | G06F 16/24542 |

* cited by examiner

*Primary Examiner* — Alford W Kindred
*Assistant Examiner* — Lin Lin M Htay
(74) *Attorney, Agent, or Firm* — Athorus, PLLC

(57) ABSTRACT

Systems and methods for de-serializing one or more data elements of a serialized structured data record are presented. In response to a request to de-serialize one or more data elements of a serialized structured data record of a first type, the location of the serialized structured data record is determined within a data file containing a plurality of serialized structured data records. Locations of the data of the one or more data elements are determined and the data of the one or more data elements is retrieved. The data is de-serialized and stored in corresponding data elements in an instantiated structured data record of the first type. The one or more data elements that are de-serialized are fewer than all of the data elements of the serialized structured data record.

20 Claims, 6 Drawing Sheets

EFFICIENT DESERIALIZATION FROM STANDARDIZED DATA FILES

BACKGROUND

All organizations (e.g., government agencies, businesses, charitable organizations, etc.) keep and maintain data records that store information for the organization, and that are used in the course of operation of the organization. Often, these data records are large, comprising thousands of discrete elements, including both primitive data elements and structured data records. Additionally, these organizations have likely created, retain and maintain more data records than can be stored within the working memory (i.e., random access memory or RAM, and/or cache memory, etc.) of a given computer system. It is well understood that data records that are not immediately needed at any given moment for processing by the computer system are most-commonly stored in data files maintained on long-term storage solutions, such as hard disks, cloud storage, optical storage devices, non-volatile memory devices, and in more archaic instances, magnetic tapes, cassettes, disks and drum memory.

Many organizations employ executable applications which utilize their data records. Typically, these, executable applications are literally compiled from millions of lines of programming code. In the execution of an application on a computer system, the storage and retrieval of data records to and from long-term storage solutions is carried out through serialization/de-serialization libraries or modules. While custom or home-grown libraries are often used, more commonly data records are serialized and de-serialized using industry-standard libraries such as, by way of illustration and not limitation, Apache's Avro or Google's Protocol Buffers.

Data files containing serialized data records do not always comprise data records of the same type. Thus, these data files often include serialized data records that are not the same size, i.e., a first serialized data record may occupy more storage space within a data file than another, second serialized data record. Even data files that comprise serialized data records of the same type are often found to include serialized data records that are not the same size: a first data record of a first type of a structured data record may include more or less data than a second data record of the first type. Accordingly, a manifest or schema for identifying what serialized data records a given data file contains, as well as how to locate any given serialized data record, must be consulted in locating the data of a serialized data record, all of which is necessary for de-serializing a serialized data record from a data file into working memory when it is requested.

As should be well-appreciated, serializing/de-serializing data records to and from a data file in a long-term storage solution is "expensive"; these operations consume an inordinate amount of bandwidth and time when compared to accessing similar data records in working memory.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
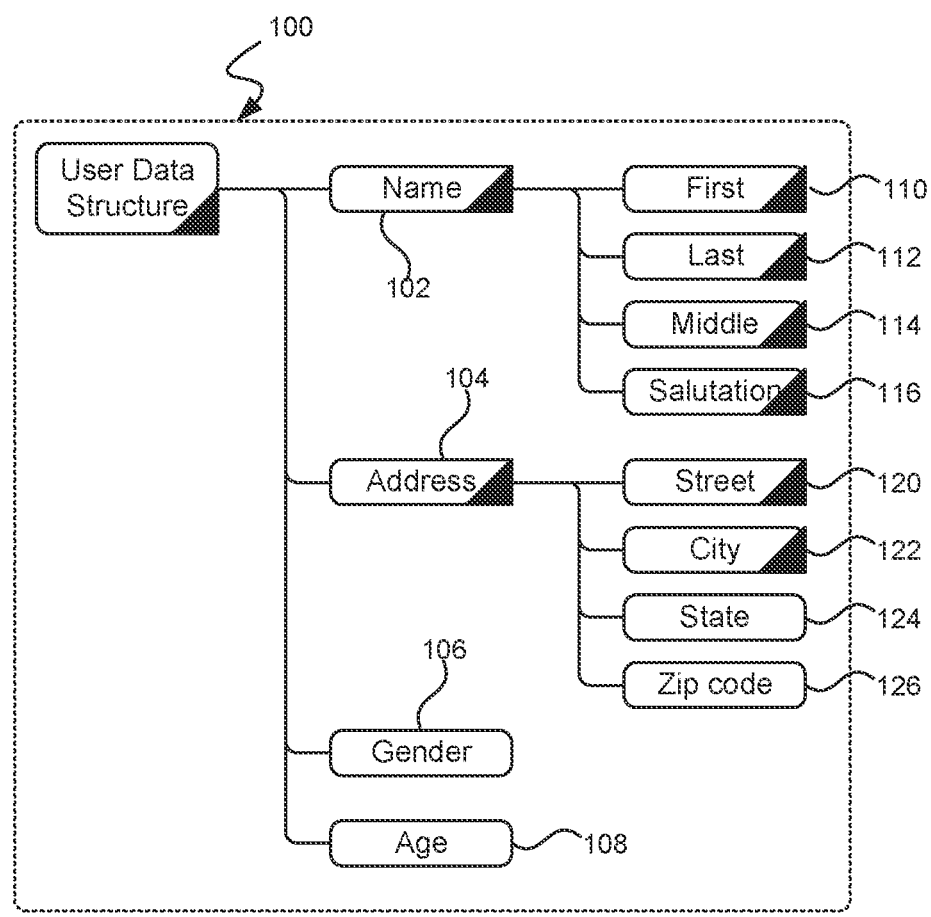
FIG. 1 is a block diagram illustrating an exemplary structured data record, comprising both primitive data elements and structured data elements (i.e., sub-structures of the exemplary structured data record), formed in accordance with aspects of the disclosed subject matter.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)," the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with multiple items should be viewed as meaning either or both items.

For further purposes of clarity and definition, the phrases "of a type," "of a first type," "of a second type," etc., are references to a programmatically defined, non-atomic structured data record type. An illustration of a programmatically defined, non-atomic structured data record type is set forth in regard to FIG. 1, below.

According to aspects of the disclosed subject matter, systems and methods for de-serializing one or more data elements of a serialized structured data record are presented. More particularly, in response to a request to de-serialize one or more data elements of a serialized structured data record of a first type, the location of the serialized structured data record is determined within a data file containing a plurality of serialized structured data records. Locations of the data of the one or more data elements are determined and the data of the one or more data elements is retrieved. The data is de-serialized and stored in corresponding data elements in an instantiated structured data record of the first type. The one or more data elements that are de-serialized are fewer than all of the data elements of the serialized structured data record.

According to additional aspects of the disclosed subject matter, a method for de-serializing data of one or more data elements of a serialized structured data record is presented.

In response to a request to de-serialize data of one or more data elements of a first serialized structured data record of a first type, where the one or more data elements comprise fewer than all data elements of a structured data record of the first type, access is made to an instantiated structured data record of the first type. A data file is accessed, where the data file includes a plurality of serialized structured data records including the first serialized structured data record. A location is determined for the first serialized structured data record in the data file. Additionally, a location for the data of each of the one or more data elements of the first serialized structured data record is determined. The serialized data of the one or more data elements is accessed or retrieved from the data file, de-serialized and stored in corresponding data elements of the instantiated structured data record. The de-serializing of the data of the one or more data elements is carried out without de-serializing the entire first serialized structured data record from the data file.

According to still further aspects of the disclosed subject matter, a computer-readable medium bearing computer-executable instructions is presented. In execution, the computer-executable instructions cause a computing system to carry out a process of de-serializing one or more data elements of a serialized structured data record stored in a data file. In execution, the computing system receives a request to de-serialize the serialized data of one or more data elements of a first serialized structured data record of a first type in the data file. The one or more data elements are fewer than all data elements of a structured data record of the first type. In response to the request, an instantiated structured data record of the first type is created. The data file is also accessed. A location for the first serialized structured data record in the data file is determined and a location for the data of each of the one or more data elements within the first serialized structured data record is/are determined. The serialized data of the one or more data elements in the serialized first structured data record in the data file is retrieved and the data is de-serialized and stored in corresponding elements of the instantiated structured data record. Additionally, de-serializing the serialized data of the one or more data elements is carried out without de-serializing the entire first serialized structured data record from the data file.

According to additional aspects of the disclosed subject matter, a computer system for de-serializing one or more data elements of a first serialized structured data record is set forth. In response to a request to deserialize the serialized data of one or more data elements of a first serialized structured data record, the computer system accesses an instantiated structured data record of a first type, the first type being the same type as the first serialized structured data record. One or more data elements are identified for de-serialization. The one or more data elements are fewer than all data elements of a structured data record of the first type. A data file storing a plurality of serialized structured data records, including the first serialized structured data record, is accessed such that data from the data file may be retrieved. A file location of the first serialized structured data record within the data file is determined and a file location of the serialized data of the one or more data elements of the first serialized structured data record is/are determined. Serialized data of the one or more data elements is retrieved from the data file and de-serialized into corresponding elements of the instantiated structured data record. The de-serialization of the one or more data elements is carried out without de-serializing all elements of the first serialized structured data record.

As those skilled in the art will appreciate, serializing and de-serializing numerous small records is inefficient as it involves file input and output. As such, organizations aggregate data into large, structured data records to minimize the number of reads/writes that are made to the data file. However, not all data within a large, structured data record is needed at any one time and, as mentioned, retrieving and de-serializing large structured data records from a data file consumes substantial processing bandwidth. Advantageously, empirical testing of the processes of the disclosed subject matter has demonstrated that, according to aspects of the disclosed subject matter, de-serializing only those elements of serialized structured data records that are needed, especially in regard to large structured data records, rather than de-serializing the entire structured data record from a file, typically produces a 30% improvement in access/retrieval time. Most of this improvement comes from the savings resulting from accessing or retrieving less data in a data file, especially for structured data records that are large. Another significant advantage of the disclosed subject matter relates to memory allocation and so-called "garbage collection," the process of reclaiming previously allocated memory and defragmenting the reclaimed memory. Indeed, as those skilled in the art will appreciate, a huge advantage is realized in bandwidth savings when smaller memory amounts of data are allocated for deserializing only some of the elements of a large, structured data record. Similar savings are realized in the garbage collection of freed-up, previously allocated memory when they are smaller memory amounts.

By way of definition, a primitive data element is a predefined type of data that does not have predefined sub-parts. Examples of primitive data elements include integers, floating points, characters and Booleans. As those skilled in the art will appreciate, depending on the programming language that is utilized, characters strings, or more simply "strings," may be provided as a primitive data type, or implemented programmatically as a structured data record. Of course, programmatically one may be able to access individual values within primitive data elements but, typically, cannot address the particular individual values and/or elements as a predefined, primitive data type. Exceptions may include the primitive data elements of strings and sets. However, the process of serializing these exception primitive data types is the same as they are treated as a discrete data unit.

In contrast to primitive data elements, a structured data record corresponds to an organization of primitive data elements and/or sub-structures, i.e., organizations of primitive elements and sub-structures. As those skilled in the art will appreciate, typically structured data records are defined in the coding/programming process. To further explain and illustrate structured data records, reference is made to FIG. 1. FIG. 1 is a block diagram illustrating an exemplary structured data record 100, formed in accordance with aspects of the disclosed subject matter. For purposes of this illustration, the boxes of the structured data record 100 that are with a filled black triangle at the bottom right are, themselves, structured data records (or, more particularly, sub-structures of the structured data record 100). Moreover, in this illustration, strings are viewed as programmatically-defined structured data records, not primitive data types.

As can be seen in FIG. 1, the exemplary structured data record 100 includes several data elements at a top-most level, including a name data element 102 (that, itself, is a sub-structure), an address data element 104 (that, itself, is also a sub-structure), a gender data element 106 (a primitive data element—e.g., a Boolean), and an age data element 108 (another primitive data element type—e.g., an integer).

In this example, the name data element 102, itself being a structured data record (a sub-structure of the structured data record 100), includes a first name data element 110, a last name data element 112, a middle name data element 114 and a salutation data element 116. Each of these data elements of the name data element is shown as being structured data records—in this case each data element being a string or array of characters. The address data element 104, also a structured data record, includes a street data element 120, a city data element 122, a state data element 124, and a zip code data element 126. While the street and city data elements are illustrated as structured data records, i.e., strings, the state data element 124 and the zip-code data element 126 are shown as primitive data elements.

As those skilled in the art will appreciate, de-serializing data elements is the activity by which the object (the data of a data element) previously serialized to a data file is reconstructed back into its original form. Typically, the de-serialization activity operates on a set or stream of bytes and reconstructs the data element from the bytes. The order of the bytes in reconstructing the data element is important. Typically, structured data elements are flattened into a set of primitive data elements and the primitive elements are converted to and stored as bytes in the data file. De-serializing activity is reversing the serialization activity. However, in accordance with aspects of the disclosed subject matter, not all data elements of a serialized structured data record are de-serialized.

Figure 2:
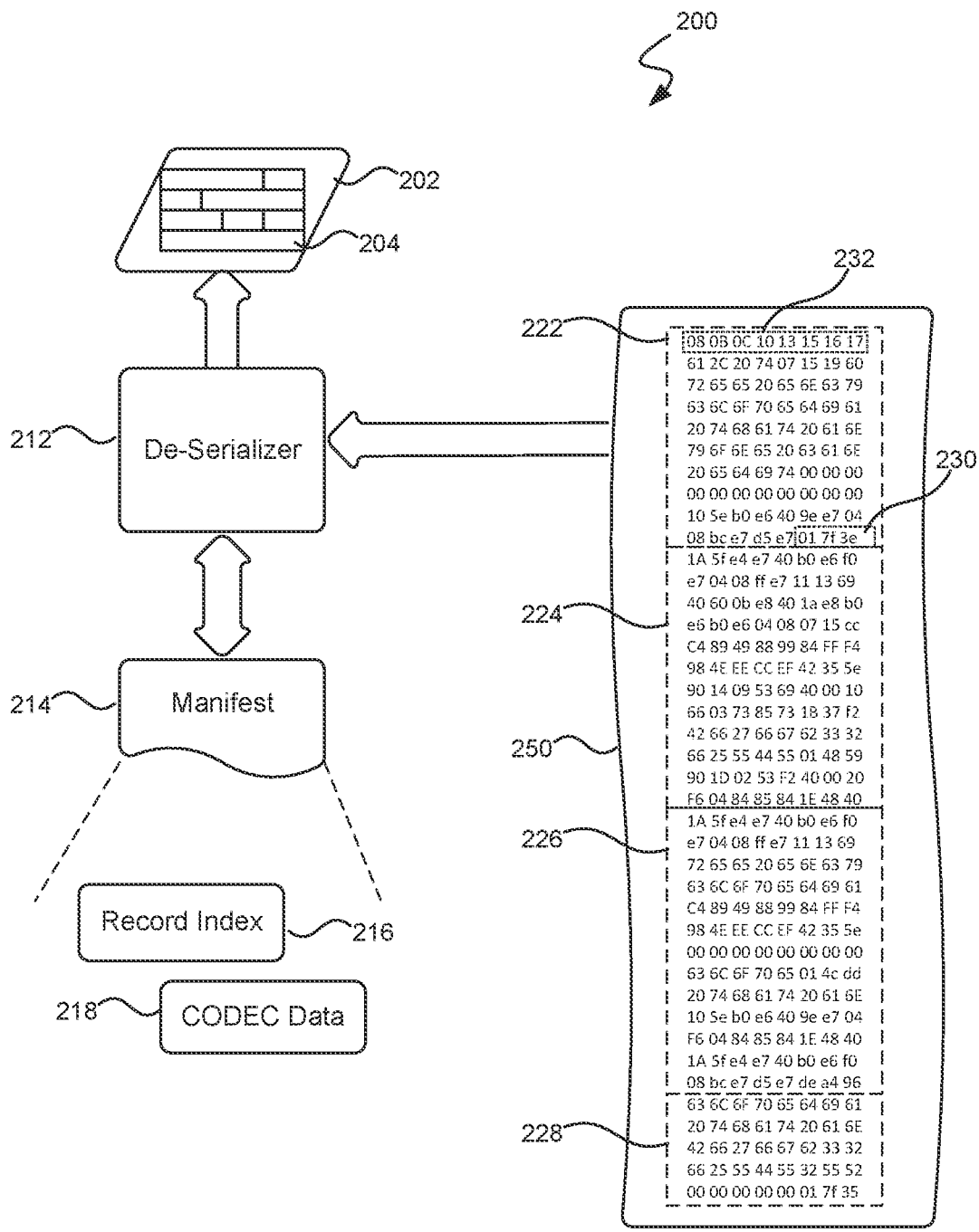
FIG. 2 is a block diagram illustrating an exemplary de-serialization process for extracting a specific data element from a serialized structured data record in a data file without de-serializing the entire structured data record, in accordance with aspects of the disclosed subject matter.

As indicated above, according to aspects of the disclosed subject matter, substantial processing time and effort can be realized by de-serializing the data of one or more data elements of a serialized structured data element without de-serializing all of the serialized structured data element. Thus, regarding de-serializing one or more data elements of a serialized structured data record from a data file, reference is made to FIG. 2. As indicated above, FIG. 2 is a block diagram illustrating an exemplary de-serialization process 200 for extracting the data of one or more data elements from a serialized data record in a data file, in accordance with aspects of the disclosed subject matter. According to aspects of the disclosed subject matter, these one or more data elements comprise fewer than all data elements of the serialized structured data record.

The de-serialization process 200 begins in response to a request to obtain one or more data elements of a serialized structured data record from a data file 250. According to aspects of the disclosed subject matter, the data file 250 includes a plurality of serialized structured data records, including serialized structured data records 222, 224, 226 and 228. As shown in FIG. 2 and according to aspects of the disclosed subject matter, these serialized structured data records are not of the same size and may or may not be of the same type/organization. However, in alternative embodiments, a data file may contain structured data records of the same type and/or size.

It should be appreciated that in many instances, a serialized structured data record may be located in a memory cache or offline memory storage, and may or may not be also located in a data file, such as data file 250. Typically, though not exclusively, this "situation" is managed by a file I/O (input/output) system, a library of routines that manages lower level operations to read data in and out of a data file including caching and managing some data in a memory.

In this illustrated example, the received request is to obtain the data of a zip-code data element 230 from the serialized structured data record 222. As part of de-serializing the requested data element, an instantiated structured data record 202 corresponding to the type of the serialized structured data is accessed (or instantiated), with the intent to store the data of the de-serialized data element in the corresponding, instantiated data element, i.e., the zip-code data element 204 of the instantiated structured data record 202. According to aspects of the disclosed subject matter, none of the fields of the instantiated structured data record need to be initialized, such that only those data elements into which de-serialized data has been stored will have relevant, meaningful data.

As part of the de-serialization process 200, an executable codec or, in this instance, a de-serialization module 212 (the "de-serializer"), determines the location of the requested serialized structured data record 222 in the data file 250 according to codec data 218 in a manifest 214. The manifest 214 contains or references information including, but not limited to, a record index 216 that identifies the location of each serialized structured data record within the data file 250. The manifest 214 may further contain information regarding the location of individual data elements within a given structured data record. Alternatively, the manifest 214 may include information regarding the order and/or organization of the data elements of a structured data record as serialized within a data file.

In addition to locating the starting location in the data file of the elements of the serialized structured data record 222, the process must also determine the location of the desired element or elements. In various instances where the information is not fully included in the manifest 214, a header 232 may be located at the start of the area of the serialized structured data record which may include offsets of each data element of the serialized structured data record. Including headers in the serialized structured data records in the data file facilitates a given structured data record to occupy more or less area in the data file than other structured data records of the same type. Typically though not exclusively, a definition of the elements of the data record, and therefore the size of the header as well as the sizes of the serialized data elements, specific to a structured data type, are included with or associated with the manifest 214. Alternatively, while a starting location of the structured data record may be known from which the first data element may be determined, the actual location of any given data element of a structured data record may need to be determined by traversing the serialized structured record, in view of the manifest 214 that provides information as to an order in which the data elements are serialized, to location of a desired data element. This type of serialization leads to efficient data storage and traversing the data record is substantially distinct from de-serializing the data elements from the serialized data file 250, or from cache memory.

In the illustrated de-serialization process 200, after identifying the location of the requested serialized structured data record 222 in the data file 250, and determining the starting location of the requested data element according to information in the header 232, the value of the zip-code data element data 230 of the serialized structured data record 222 in the data file 250 is accessed or retrieved. With the data of the requested data element retrieved, the de-serializer 212 executes a sequence of operations to reconstruct or reorganize the accessed data into the form of the requested data element type. In various embodiments, this sequence of operations is described as part of the codec data 218 associated with or included in the manifest 214. As final part of de-serializing the data, the de-serializer 212 stores the value of the de-serialized data in the instantiated structured data record.

The de-serialization process 200 may be used to access both primitive and structured data elements from a data file 250. In the case of de-serializing structured data elements, the manifest may include information on "flattening" a given structured data record and the sub-structures of the structured data record of a given type to their primitive data elements, i.e., determining an order of the constituent primitive data elements of the structured data record as serialized data, as well as information on how to map the primitive data elements back into an instantiation of the structured data record of the given type.

Figure 3:
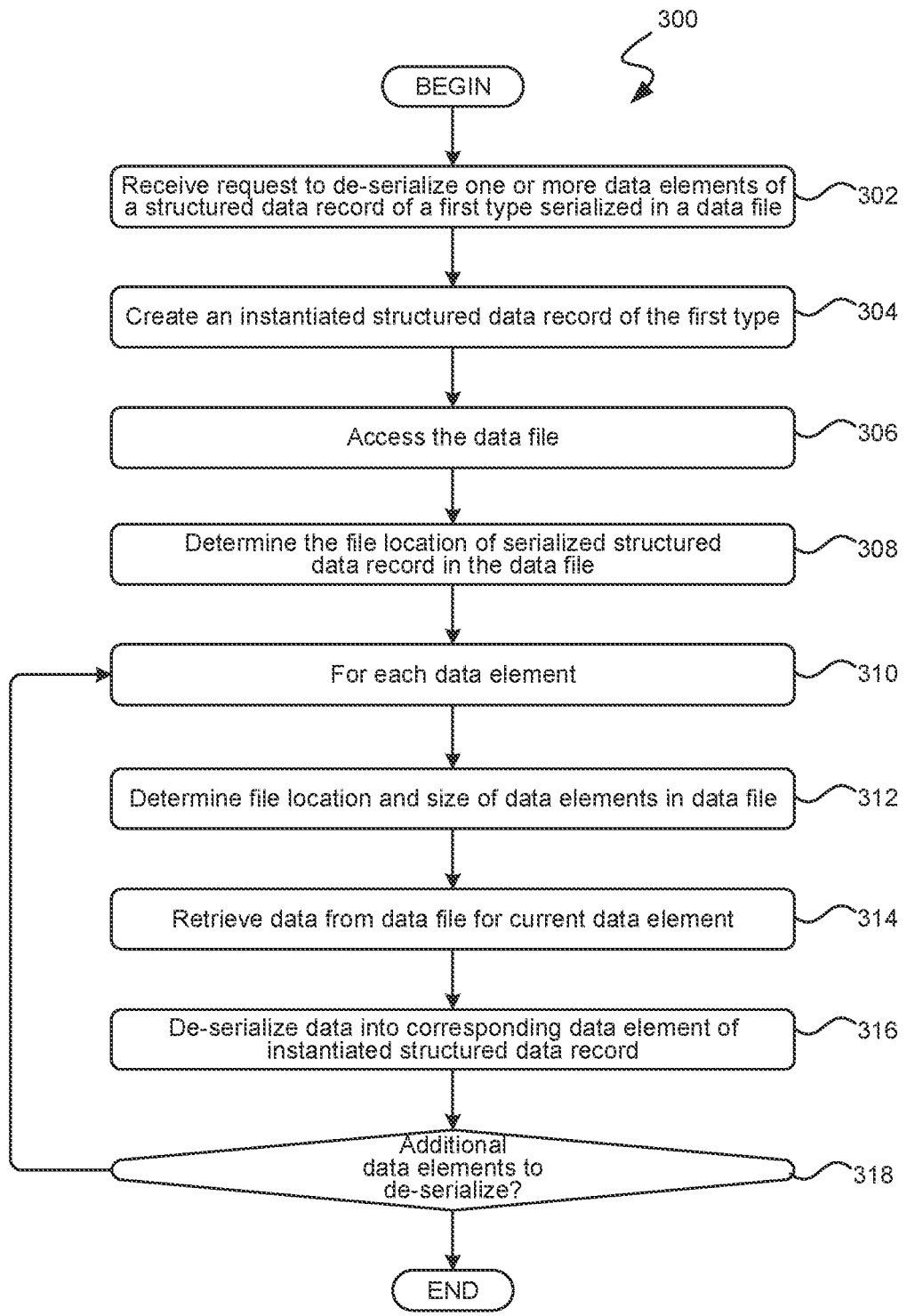
FIG. 3 is a flow diagram of an exemplary routine for de-serializing and storing data elements from a serialized structured data record of a first type into an instantiation of a structured data record of the same type, in accordance with aspects of the disclosed subject matter.

To further illustrate this de-serialization process, reference is made to FIG. 3. FIG. 3 is a flow diagram of an exemplary routine 300 for de-serializing and storing the values of data elements from a serialized data record into an instantiation of a structured data record, in accordance with aspects of the disclosed subject matter.

Beginning at block 302, a request is received to de-serialize one or more data elements of a serialized structured data record of a first type in a data file. In accordance with aspects of the disclosed subject matter, the one or more data elements of the structured data record are fewer than all of the data elements of the serialized structured data record in the data file.

At block 304, an instantiated structured data record of the first type is accessed. According to various embodiments of the disclosed subject matter, the instantiated structured data record may be entirely uninitialized: i.e., data elements of the instantiated structured data record may be set to values indicating that they are uninitialized, yet do not include any values of a serialized data structured data record.

At block 306, the data file is accessed. It should be appreciated that, for purposes of routine 300, accessing the data file, such as data file 250, and reading data from the data file, are not the same. "Accessing" may include opening the data file for reading or data retrieval, but does not include any reading or retrieval from the data file. In various programming languages, accessing the data file corresponds to create a handle for the data file through with reading/retrieval may be conducted.

At block 308, the location of the requested serialized data structure is determined. As indcted above, this location may be determined from a record index 216 maintained in conjunction with the data file. Of course, other methods, including but not limited to accessing a header within the data file that identifies the location of the various records within the data structure, and/or a traversal of the data file to locate the requested serialized structured data record may be used.

After determining the location of the serialized structured data record in the data file, such as serialized structured data record 222 in data file 250, at block 310, an iteration is begun to de-serialize each of the one or more data elements to be de-serialized. As part of the iteration and with respect to a currently-iterated data element, at block 312 the actual location of the currently iterated data element in the serialized structured data record is determined. As mentioned above, this determination may be made according to information in the manifest 214 and/or according to information regarding data elements locations within the serialized structured data record as stored in a header in the serialized structured data record, such as header 232 of the serialized structured data record 222 of data file 250. In addition to determining the location in the data file for the currently-iterated data element, the size of the data element is also determined. This may be determined according to the type of the data element, as may be found in the manifest 214 or other related information including information from a header of the serialized structured data record.

At block 314, and as another part of the iteration, the data corresponding to the currently-iterated data element is read or otherwise retrieved from the data file. At block 316, the retrieved data is de-serialized according to codec data 218 for reconstituting the data into the corresponding data element type, and stored as the value of the corresponding data element of the instantiated structured data record. At block 318, if there are additional data elements to process, the routine 300 returns to block 310 to repeat the iteration for another requested data element. Alternatively, if there are no more data elements to de-serialize, the routine 300 terminates.

Regarding the routine 300 above, in an effort to minimize reads/retrievals from the data file 250, in an alternative embodiment, the extent of the requested data of all of the one or more data elements, from the first-appearing data element to the final data element in the serialized structured data record, may be determined and a single read or retrieval may be carried out. As structured data records are typically large and the to-be-retrieved data elements of a given serialized structured data record are often related and stored in close proximity, a single retrieval or read of the data file (containing the data of the one or more data elements to be de-serialized) is often more efficient than multiple retrievals, and a single retrieval need not result in all of the serialized structured data records to be retrieved.

Serialization and de-serialization processes are typically carried out through the use of input/output libraries, which frequently include the ability to de-serialize an entire record from a data file. In many instances, for individual organizations there have been millions of lines of programming code written to implement various features of custom applications, and these lines of code include calls to de-serialize structured data records from a data file. However, while these lines of code cause the de-serialization of an entire structured data record, the fact is that only a small portion of the fields within the structured data record are typically utilized—thus creating an inefficiency in processing since de-serializing an entire structured data record when only a small portion of that record is needed results in large inefficiency. By providing a de-serialization process, such as routine 300, to de-serialize only those data elements of a given serialized structured data record that are needed at a particular time results in substantial and significant bandwidth savings, which is a huge technical advantage. Another advantage is that by de-serializing only those data elements of a serialized structured data record into an instantiated structured data record, existing programming code that makes use of those data elements within an instantiated structured data record can remain largely unmodified and, therefore, unbroken by modification. Simply put, millions of lines of programming code can remain untouched and, therefore, unbroken. While not particularly measurable in terms of computing bandwidth, the technical advantage of not modifying millions of lines of programming code is as technically significant, if not more technically significant that the savings in processing bandwidth.

Figure 4:
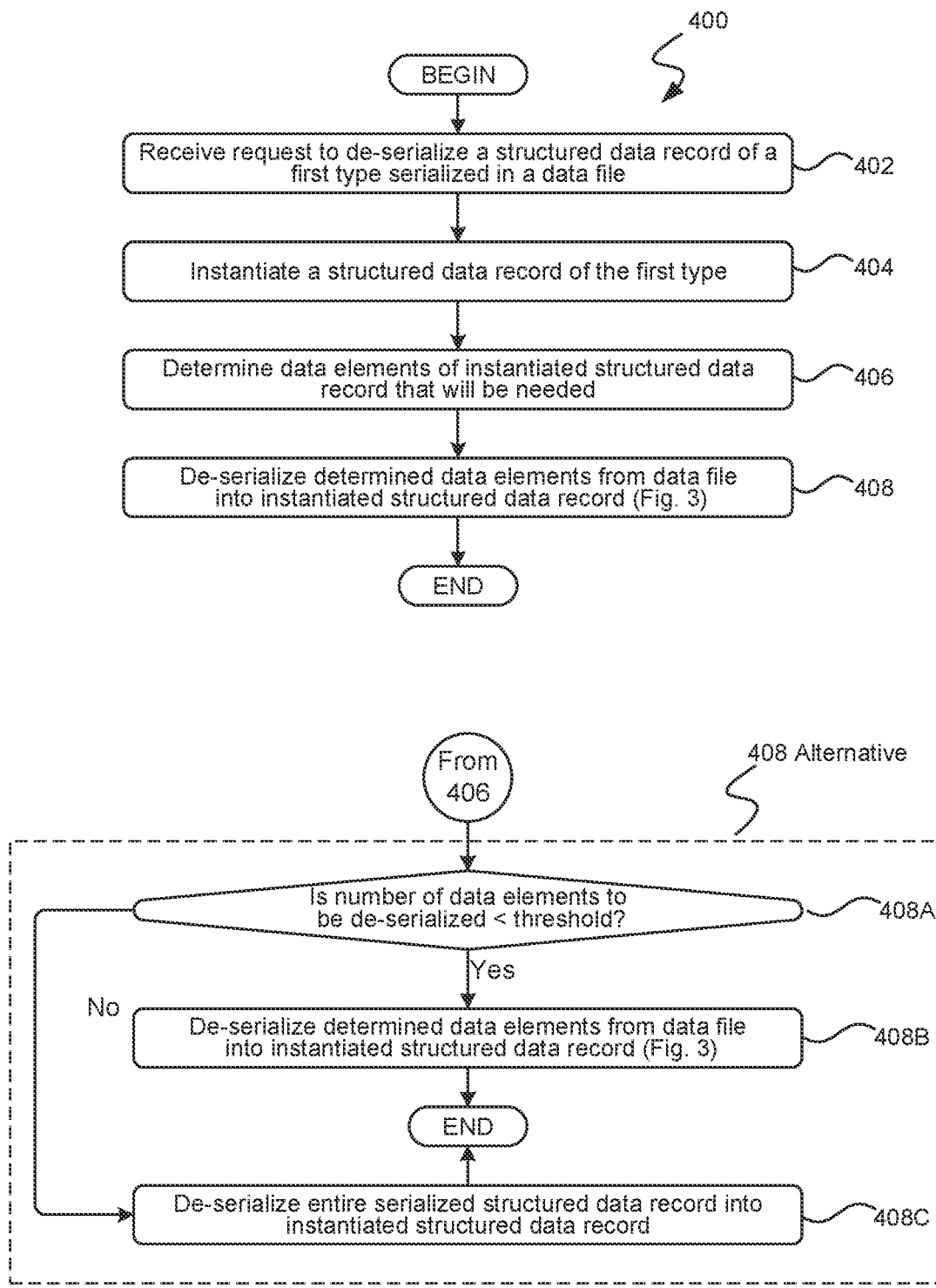
FIG. 4 is a flow diagram illustrating an exemplary routine for de-serializing an entire serialized structured data record or a subset of all data elements, depending on a current need for processing, and formed in accordance with aspects of the disclosed subject matter.

Regarding the use of serializing/de-serializing libraries, while an additional feature/application programming interface (API) could be added to an existing library to de-serialize one or more data elements of a particular serialized structured data record from a data file, a routine to de-serialize only those data elements that may be needed may be implemented. FIG. 4 is a flow diagram illustrating an exemplary routine 400 for de-serializing a subset of all data elements, depending on a current execution context need, and formed in accordance with aspects of the disclosed subject matter.

Beginning at block 402, a request to de-serialize all or some data elements of a serialized structured data record is received. At block 404, a structured data record corresponding to the type of the serialized structured data record is instantiated. As indicated above and according to aspects of the disclosed subject matter, while a structured data record is instantiated, initialization of the data elements within the instantiated structured data record is not necessary.

At block 406, an analysis as to which data elements that should be de-serialized is carried out. In accordance with various aspects of the disclosed subject matter, the analysis may be made as a just-in-time analysis of the current execution stack or context, and executable code to identify which data elements of the serialized structured data record will be needed before dismissal of the instantiated structured data record. Alternatively, an offline analysis may have been conducted to determine which data elements of the serialized structured data record are needed and a result of the offline analysis is consulted. Typically, though not exclusively, the data elements to be de-serialized may be found in a de-serialization list corresponding to the current location in execution.

At block 408, the data elements of the serialized data structure to be de-serialized, as may be indicated in the de-serialization list, are de-serialized and stored in the instantiated structured data record. Thereafter, the routine 400 terminates.

There may be instances in which the overall number of data elements to be de-serialized is so close to the entirety of the data elements of the serialized data structure that it makes sense to de-serialize the whole structured data record, rather than individual data elements. Accordingly, FIG. 4 also illustrates an exemplary block 408 alternative. In this exemplary alternative, at decision block 408A, a determination is made as to whether the number of data elements to be de-serialized from the serialized structured data record is fewer than a threshold amount. While a threshold amount may be determined and set at any value, in one embodiment the threshold amount may be based on a percentage of data elements, such as 75%, meaning if less than 75% of the data elements are needed, then the currently needed (based on the execution content) one or more data elements are de-serialized. Conversely, if the threshold amount is met or exceeded, then the efficiencies of de-serializing specific data elements of the serialized structured data record may not be realized and, instead, the entire serialized structured data record should be de-serialized.

If, at block 408A, the number (or total amount) of data elements of the serialized structured data record to de-serialize from the data file falls below the threshold amount, the routine proceeds to block 408B. Alternatively, if the number of data elements to de-serialize (or the overall amount of data to de-serialize) meets or exceeds the threshold, the routine 400 proceeds to block 408C.

At block 408B, the currently-needed one or more data elements to de-serialize from the serialized structured data record, as determined in block 406 and which may be found in the de-serialization list, are de-serialized as discussed above in regard to routine 300 of FIG. 3. Alternatively, at block 408C, the entire structured data record is de-serialized from the data file and stored into the instantiated structured data record. Thereafter, the routine 400 terminates.

As indicated previously, the data elements of a serialized structured data record to be de-serialized, as may be found in a de-serialization list, may be generated by an off-line, static analysis of a given execution point (often at the instantiation of a structured data record corresponding to the serialized structured data record to be deserialized), or by a dynamic, just-in-time analysis. In an alternative embodiment and according to aspects of the disclosed subject matter, the code corresponding to management and operation of a structured data record may be enhanced to track the instantiation and program location of instantiation, the access of data elements during the "lifetime" of the instantiated structured data record, and data elements access counts, through the existence of the instantiated structured data record. This tracked information may be used to generate a de-serialization list for the corresponding structured data record at the given execution point such that a call to de-serialize the serialized structured data record may be modified to de-serialize only needed data elements, as described herein.

Regarding routines and processes 200, 300 and 400 described above, as well as other routines and/or processes that may be described or suggested herein, while these routines/processes are expressed in regard to discrete steps, these steps should be viewed as being logical in nature and may or may not correspond to any specific, actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted.

Optimizations of routines may be carried out by those skilled in the art without modification of the logical process of these routines and processes. Those skilled in the art will recognize that the logical presentation of steps is sufficiently instructive to carry out aspects of the claimed subject matter irrespective of any specific development or coding language in which the logical instructions/steps are encoded. Additionally, while some of these routines and processes may be expressed in the context of recursive routines, those skilled in the art will appreciate that such recursive routines may be readily implemented as non-recursive calls without actual modification of the functionality or result of the logical processing. Accordingly, the particular use of programming and/or implementation techniques and tools to implement a specific functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computer system 600 described in FIG. 6 below. Additionally, in various embodiments, all or some of the various routines may also be embodied in executable hardware modules including, but not limited to, systems on chips (SoC's), codecs, specially designed processors and/or logic circuits, and the like.

As suggested above, these routines and/or processes are typically embodied within executable code segments and/or modules comprising routines, functions, looping structures, selectors and switches such as if-then and if-then-else statements, assignments, arithmetic computations, and the like that, in execution, configure a computing device or computer system to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in executable instructions embodied within applications (also referred to as computer programs), apps (small, generally single or narrow purposed applications), and/or methods, these aspects may also be embodied as computer-executable instructions stored by computer-readable media, also referred to as computer-readable storage media, which (for purposes of this disclosure) are articles of manufacture. As those skilled in the art will recognize, computer-readable media can host, store and/or reproduce computer-executable instructions and data for later retrieval and/or execution. When the computer-executable instructions that are hosted or stored on the computer-readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer-readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer-readable media may reproduce and/or cause to deliver the computer-executable instructions and data to a computing device for execution by one or more processors via various transmission means and mediums, including carrier waves and/or propagated signals, for purposes of this entire disclosure, and unless specifically stated otherwise, claims of computer-readable media expressly exclude carrier waves and/or propagated signals.

Figure 5:
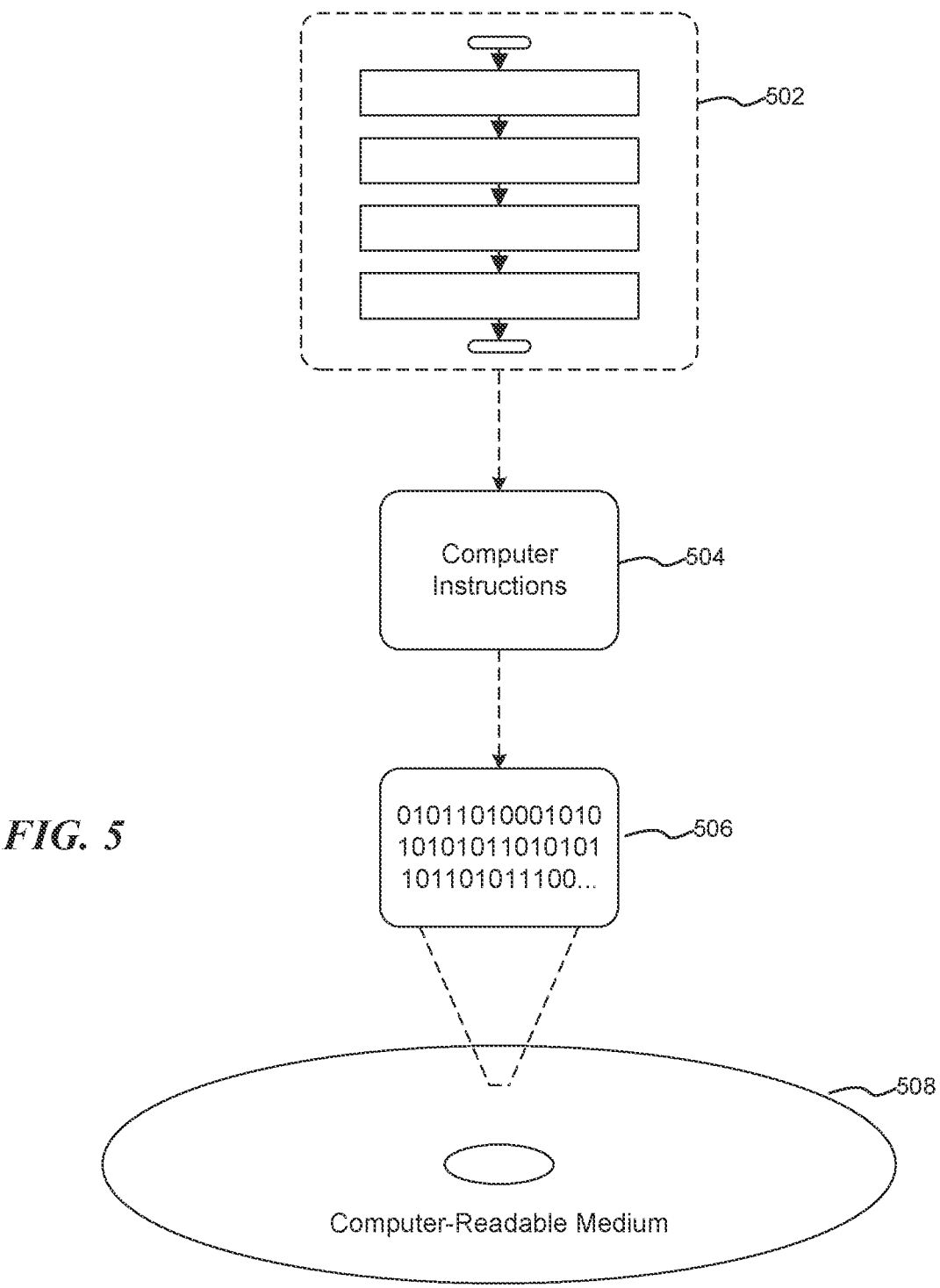
FIG. 5 is a block diagram illustrating exemplary computer-readable media encoded with instructions for de-serializing one or more data elements of a serialized structured data record from a data file, formed in accordance with aspects of the disclosed subject matter.

Regarding computer-readable media, FIG. 5 is a block diagram illustrating exemplary computer-readable media 508 encoded with instructions for de-serializing one or more data elements of a serialized structured data record from a data file, formed in accordance with aspects of the disclosed subject matter. More particularly, the illustrated implementation comprises a computer-readable medium 508 (e.g., a CD-R, DVD-R or a platter of a hard disk drive), on which is encoded computer-readable data 506. This computer-readable data 506 in turn comprises a set of processor-executable instructions 504 configured to operate according to one or more of the principles set forth herein. In one such embodiment 502, the processor-executable instructions 504 may be configured to perform a method, such as at least some of exemplary routines and processes 200, 300 and 400, for example. In another such embodiment, the processor-executable instructions 504 may be configured to implement a system on a computing system or device, such as at least some of the exemplary, executable components of computer system 600, as discussed in FIG. 6 below. Many such computer-readable media may be devised, by those of ordinary skill in the art, which are configured to operate in accordance with the techniques presented herein.

Figure 6:
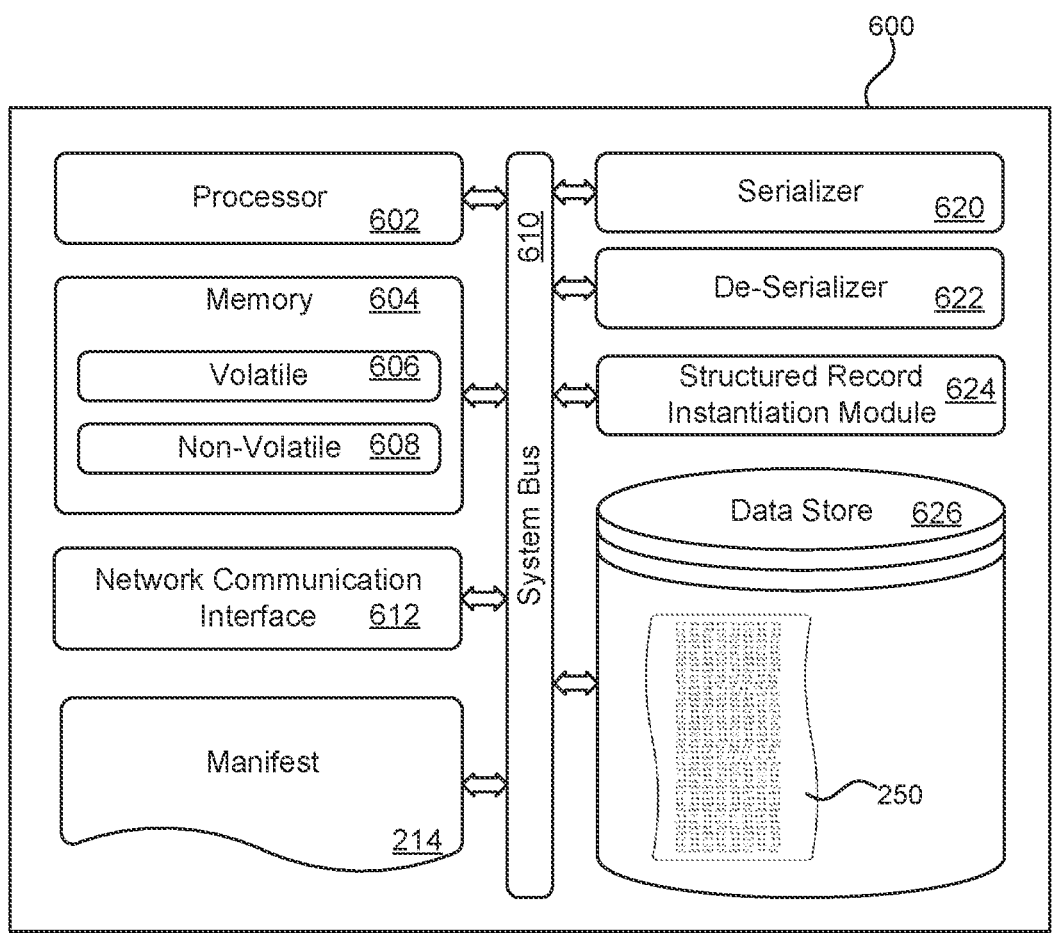
FIG. 6 is a block diagram illustrating exemplary components of a computer system suitable for implementing efficient serialization and de-serialization of data elements of structured data records, in accordance with aspects of the disclosed subject matter.

Turning to FIG. 6, FIG. 6 is a block diagram illustrating exemplary components of a computer system 600 suitable for implementing efficient serialization and de-serialization of data elements of a structured data record, in accordance with aspects of the disclosed subject matter. The computer system 600 typically includes one or more central processing units (or CPUs), such as CPU 602, and further includes at least one memory, such as memory 604, from which executable instructions and data may be retrieved. The CPU 602 and memory 604, as well as other components of the computing system, are typically interconnected by way of a system bus 610.

As will be appreciated by those skilled in the art, the memory 604 typically (but not always) comprises both volatile memory 606 and non-volatile memory 608. Volatile memory 606 retains or stores information so long as the memory is supplied with power. In contrast, non-volatile memory 608 can store (or persist) information even when a power supply is not available. In general, RAM and CPU cache memory are examples of volatile memory 606 whereas ROM, solid-state memory devices, memory storage devices, and/or memory cards are examples of non-volatile memory 608.

As will be also appreciated by those skilled in the art, the CPU 602 executes instructions retrieved from the memory 604 from computer-readable media, such as computer-readable medium 508 of FIG. 5, and/or other executable components, in carrying out the various functions of the disclosed subject matter. The CPU 602 may be comprised of any of several available processors, such as single-processor, multi-processor, single-core units, and multi-core units, which are well known in the art.

Further still, the illustrated computer system 600 typically also includes a network communication interface 612 for interconnecting this computing system with other devices, computers and/or services over a computer network, including remote storage devices upon which a data file with serialized data may reside. The network communication interface 612, sometimes referred to as a network interface card or NIC, communicates over a network using one or more communication protocols via a physical/tangible (e.g., wired, optical fiber, etc.) connection, a wireless connection such as Wi-Fi or Bluetooth communication protocols, NFC, or a combination thereof. As will be readily appreciated by those skilled in the art, a network communication interface, such as network communication interface 612, is typically comprised of hardware and/or firmware components (and may also include or comprise executable software components) that transmit and receive digital and/or analog signals over a transmission medium.

The exemplary computer system 600 further includes a serializer 620 and a de-serializer 622. The serializer 620 is configured to serialize structured data records to a data file, such as data file 250 in data store 626, according to codec data 218 in or associated with the manifest 214. In contrast, the de-serializer 622 is configured to de-serialize serialized structured data records from a data file, such as data file 250.

According to aspects of the disclosed subject matter, the de-serializer 622 includes the functionality to de-serialize one or more data elements of a serialized structured data record of a first type into an instantiation of the structured data record of the first type, where the one or more data elements are fewer than all data elements of the serialized structured data record.

According to aspects of the disclosed subject matter, the serializer 620 and the de-serializer 622 are part of an executable library that includes, as an extension, the functionality of the de-serializer to de-serialize one or more data elements from a serialized structured data record without de-serializing all data elements of the serialized structured data record.

Also included in the computer system 600 is a structured record instantiation module 624 which, as indicated above, is configured to create an instance, i.e., an instantiation, of a structured data record as part of de-serializing one or more data elements of a serialized structured data record.

Regarding the various components of the exemplary computer system 600, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes and routines described in this document, or as hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for de-serializing data elements of a structured data record from a data file, the method comprising:
   receiving a request to de-serialize one or more data elements of a first serialized structured data record of a first type from a data file containing a plurality of serialized structured data records, wherein a structured data record of the first type comprises a plurality of data elements greater in number than the requested one or more data elements;
   accessing an instantiated structured data record of the first type into which the de-serialized data of the one or more data elements of the first serialized structured data record are to be stored;
   accessing the data file containing the plurality of serialized structured data records, including the first serialized structured data record;
   determining a file location in the data file corresponding to the one or more data elements of the first serialized structured data record;
   retrieving the serialized data of the one or more data elements of the first serialized structured data record from the data file at the file location in the data file corresponding to the one or more data elements; and
   de-serializing the serialized data of the one or more data elements into corresponding data elements of the instantiated structured data record,
   wherein de-serializing the serialized data of the one or more data elements of the first serialized structured data record is carried out without de-serializing all data elements of the first serialized structured data record in the data file.

2. The computer-implemented method of claim 1, wherein the plurality of serialized data records in the data file comprise serialized data records of different types, including the first type.

3. The computer-implemented method of claim 1, wherein the first serialized structured data record in the data file is not the same size as a second serialized structured data record of the first type in the data file.

4. The computer-implemented method of claim 1, wherein determining the file location in the data file corresponding to the one or more data elements of the first serialized structured data record comprises determining a file location in the data file corresponding to the first serialized structured data record according to a manifest identifying file locations of serialized structured data records in the data file, including the first serialized structured data record, and wherein the manifest is included in a file separate from the data file.

5. The computer-implemented method of claim 4, wherein determining the file location in the data file corresponding to the one or more data elements of the first serialized structured data record further comprises accessing a first serialized structured data record header corresponding to the first serialized structured data record in the data file, and determining the file location in the data file corresponding to the one or more data elements according to information in the first serialized structured data record header.

6. The computer-implemented method of claim 4, wherein determining the file location in the data file corresponding to the one or more data elements of the first serialized structured data record further comprises determining the file location in the data file corresponding to the one or more data elements as an offset of the file location in the data file corresponding to the first serialized structured data record.

7. The computer-implemented method of claim 4, wherein each of the one or more data elements has a corresponding data element type; and
   wherein de-serializing the serialized data of the one or more data elements into corresponding data elements of the instantiated structured data record comprises de-serializing the serialized data of the one or more data elements according to de-serialization information in the manifest for each corresponding data element type of the one or more data elements.

8. The computer-implemented method of claim 7, wherein the one or more data elements comprise a plurality of data elements, and wherein the plurality of data elements includes at least two data element types.

9. The computer-implemented method of claim 8, wherein the plurality of data element types includes at least one structured data record.

10. A computer-readable medium bearing computer-executable instructions which, when executed by a processor of a computing system, cause the computing system to, at least:

receive a request to de-serialize data of one or more data elements of a first serialized structured data record of a first type from a data file containing a plurality of serialized structured data records, wherein a structured data record of the first type comprises a plurality of data elements greater in number than the requested one or more data elements;

access an instantiated structured data record of the first type into which the de-serialized data of the one or more data elements of the first serialized structured data record are to be stored;

access the data file containing the plurality of serialized structured data records, including the first serialized structured data record;

determine a file location in the data file corresponding to the one or more data elements of the first serialized structured data record;

retrieve the serialized data of the one or more data elements of the first serialized structured data record from the data file at the file location in the data file corresponding to the one or more data elements; and de-serialize the serialized data of the one or more data elements into corresponding data elements of the instantiated structured data record, wherein de-serializing the serialized data of the one or more data elements of the first serialized structured data record is carried out without de-serializing all data elements of the first serialized structured data record in the data file.

11. The computer-readable medium of claim 10, wherein the instantiated structured data record is instantiated with un-initialized data elements.

12. The computer-readable medium of claim 11, wherein execution of the computer-executable instructions further cause the computing system to, at least, update the instantiated structured data record to indicate that one or more data elements of the instantiated structured data record corresponding to the one or more data elements are initialized data elements, wherein the initialized data elements are fewer than all data elements of the instantiated structured data record.

13. The computer-readable medium of claim 12, wherein execution of the computer-executable instructions further cause the computing system to, at least, pass the instantiated structured data record to a receiving process of an executable module that accepts, as a parameter, an instantiated structured data record, wherein the instantiated structured data record includes initialized data elements corresponding to the one or more data elements of the first serialized structured data record that have been initialized with data.

14. The computer-readable medium of claim 13, wherein execution of the computer-executable instructions further cause the computing system to, at least, and prior to accessing the data file containing the plurality of serialized structured data records, identify which of the one or more data elements of the first serialized structured data record are to be de-serialized from the data file.

15. The computer-readable medium of claim 14, wherein the computing system identifies which of the one or more data elements of the first serialized structured data record is to be de-serialized from the data file according to a just-in-time analysis of the receiving process of the executable module.

16. The computer-readable medium of claim 14, wherein the computing system identifies which of the one or more data elements of the first serialized structured data record is to be de-serialized from the data file according to information of a previously-conducted analysis of the receiving process of the executable module.

17. A computer system comprising a processor and a memory, wherein the processor executes instructions stored in the memory as part of or in conjunction with additional components, to respond to a text-based request, and configures the computer system to at least:

receive a request to de-serialize serialized data of one or more data elements of a first serialized structured data record of a first type from a data file containing a plurality of serialized structured data records, wherein a structured data record of the first type comprises a plurality of data elements greater in number than the requested one or more data elements;

access an instantiated structured data record of the first type into which the de-serialized data of the one or more data elements of the first serialized structured data record are to be stored;

identify which of the one or more data elements of the first serialized structured data record are to be de-serialized from the data file;

access the data file containing the plurality of serialized structured data records including the first serialized structured data record;

determine a file location in the data file corresponding to the identified one or more data elements of the first serialized structured data record;

retrieve the serialized data of the identified one or more data elements of the first serialized structured data record from the data file at the file location in the data file corresponding to the identified one or more data elements; and de-serialize the serialized data of the identified one or more data elements into corresponding data elements of the instantiated structured data record, wherein de-serializing the serialized data of the identified one or more data elements of the first serialized structured data record is carried out without de-serializing all data elements of the first serialized structured data record in the data file.

18. The computer system of claim 17, wherein the computer system, in determining the file location in the data file corresponding to the identified one or more data elements of the first serialized structured data record, is further configured to, at least, determine a file location in the data file corresponding to the first serialized structured data record according to a manifest identifying file locations of serialized structured data records in the data file, including the first serialized structured data record, and wherein the manifest is included in a file separate from the data file.

19. The computer system of claim 18, wherein the computer system, in determining the file location in the data file corresponding to the identified one or more data elements of the first serialized structured data record, is further configured to, at least:

access a first serialized structured data record header corresponding to the first serialized structured data record in the data file, and determine the file location in the data file corresponding to the one or more data elements according to information in the first serialized structured data record header.

20. The computer system of claim 18, wherein the identified one or more data elements comprise a plurality of data elements, wherein the plurality of data elements includes at least two data element types, and wherein the plurality of data element types includes at least one structured data record.

\* \* \* \* \*